Oct. 20, 1959  G. K. NEWELL  2,909,294
WAYSIDE CAR DOOR ACTUATOR
Filed Nov. 26, 1957  2 Sheets-Sheet 1
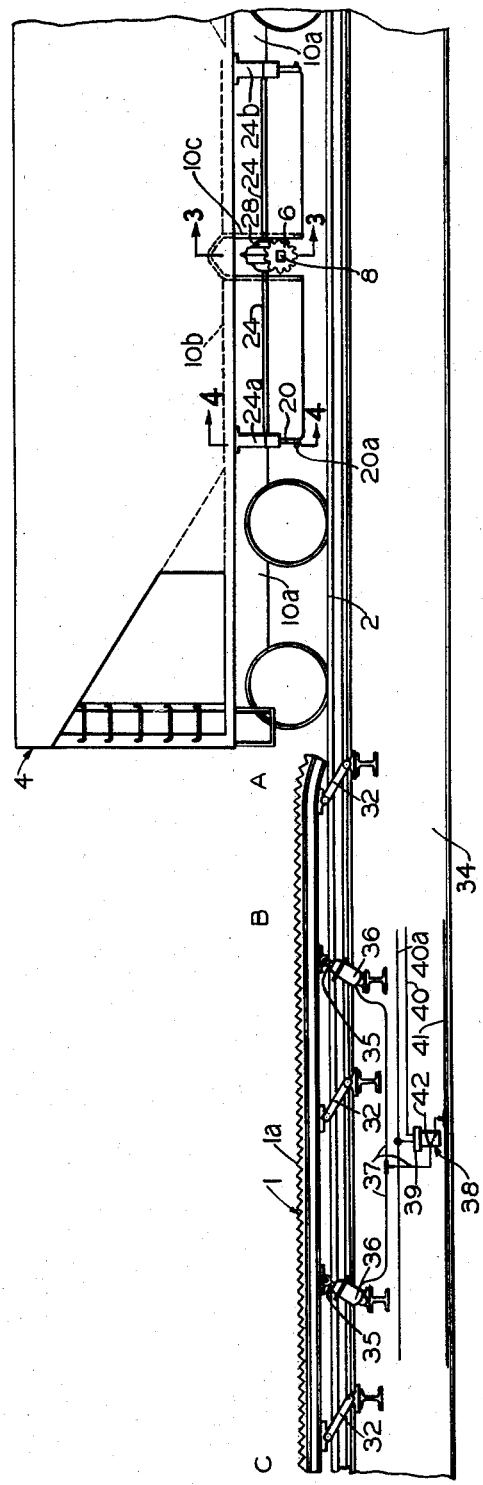
INVENTOR.
GEORGE K. NEWELL
BY
Adelbert A. Steinmiller
ATTORNEY

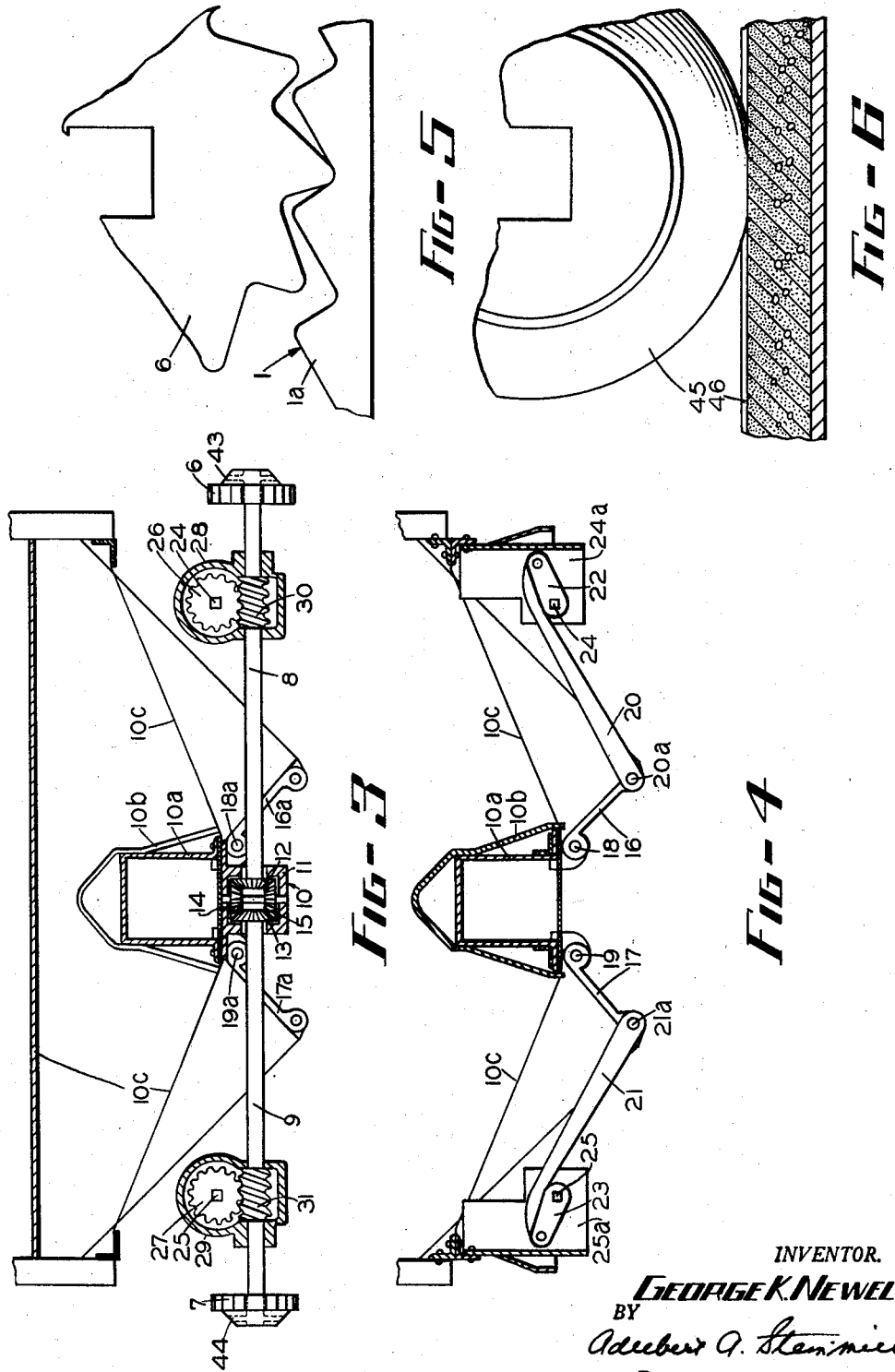

United States Patent Office 2,909,294
Patented Oct. 20, 1959

2,909,294

WAYSIDE CAR DOOR ACTUATOR

George K. Newell, Trafford, Pa., assignor to Westinghouse Air Brake Company, Wilmerding, Pa., a corporation of Pennsylvania Application November 26, 1957, Serial No. 698,989

13 Claims. (Cl. 214—63)

This invention relates to apparatus for automatically controlling, from the wayside, selective actuation of mechanism on a vehicle moving in a certain direction in a defined path, and more particularly relates to apparatus for automatically controlling, from the wayside, selective opening and closing of oppositely swingable dump doors on hopper cars or oppositely operated discharged valves on tank cars or the like while such cars are moving in said certain direction along railroad tracks.

According to the invention, as a train of hopper cars or tank cars moves in a certain direction over a dumping area, each car will pass over a plurality of spaced opening or discharge control members, each of which is disposed at one side of the rails and above one of a plurality of adjoining cargo-receiving receptacles; and then, after such car moves beyond said area in said certain direction, it will pass over a single closing control member disposed at the opposite side of the rails. These opening and closing control members are normally biased to a lowered position but they may be selectively actuated to an elevated position by such as remotely controlled fluid pressure motors or air springs. Each car carries a pair of rotatable elements arranged at opposite sides of the car and each coaxially connected to a respective shaft. Each of said shafts extends transversely of the car into engagement with a reversing gear mechanism and also has a worm for engaging a reduction gear that operatively controls opening and closing of the dump doors or discharge valves at the corresponding side of the car. If, as the train moves in said one direction, one of the opening control members is elevated, a rotatable element at that side of the rails, hereinafter referred to as an opening rotatable element, and hence its shaft, will be rotated one way and operatively effect opening of the dump doors or discharge valves at that side of the car and also, through the reversing gear mechanism, rotate the other shaft the opposite way for opening the dump doors or discharge valves at the opposite side of the cars; whereas, if during such movement of the train, the closing control member is elevated, the closing rotatable element associated with said other shaft will rotate the latter said one way and operatively effect closure of the dump doors or discharge valves on both sides of the cars, through the gearing just described.

According to different embodiments of the invention, these opening and closing control members may be in the form of racks or in the form of channels providing a good abrasive surface, and the rotatable elements may be pinions for engaging the racks or rubber-tired wheels for engaging the channels. In either event, the opening and closing control members will be of substantially identical configuration.

In the accompanying drawings, Fig. 1 is a schematic plan view showing the relative positions of those parts of the control apparatus embodying the invention which are disposed on the wayside; Fig. 2 is a side elevation view of one of the door-opening control racks shown schematically in Fig. 1 and also a side elevation view of a hopper car showing a portion of the control apparatus, including a pinion, carried by said car but omitting details of the conventional car body suspension mechanism; Fig. 3 is a section, to enlarged scale, taken along the line 3—3 of Fig. 2; Fig. 4 is a section, to the same enlarged scale as Fig. 3, taken along the line 4—4 of Fig. 2; Fig. 5 is an enlarged fragmentary view of the door-opening control rack located on the wayside and of the opening pinion carried on the car, shown in Fig. 2; and Fig. 6 is an enlarged fragmentary view, partly in section, of a rubber-tired wheel and a concrete channel which, according to another embodiment of the invention, may be employed in lieu of the pinion and rack shown in Fig. 5.

Description—Figs. 1 to 5

As shown in Fig. 1, the control apparatus embodying the invention comprises a plurality of spaced door-opening control racks 1 disposed at one side of and running parallel to a railroad track 2 that passes over a dumping trestle below which are a series of adjoining, preferably inverted frustro-pyramid shaped, receptacles 3 into which hopper cars 4 of the train may discharge their cargo; and said apparatus also comprises a single door-closing control rack 5 disposed downtrack of the racks 1 and at the opposite side of and running parallel to the track 2.

Referring also to Figs. 2 through 5, and assuming that the train moves leftward as viewed in Figs. 1 and 2, the control apparatus also comprises on each car 4 a door-opening pinion 6 and a door-closing pinion 7 which are disposed at opposite sides of, and preferably substantially equidistant from the ends of, such car; said pinions 6 and 7 being so disposed on the cars that they will pass vertically over the racks 1 and 5, respectively. The pinions 6, 7 are preferably coaxially aligned and coaxially connected to respective shafts 8, 9 that extend transversely of the respective car into engagement with a reversing gear mechanism 10.

This mechanism 10 comprises, briefly, a sectionalized gear box 11 suitably secured to the under frame of the body of the car 4 below the conventional longitudinally extending center sill 10a on which cargo deflectors 10b (only one of which is shown) are superposed and which mechanism 10 is contained within a generally inverted U-shaped shroud 10c that extends crosswise of the car and projects above and intersects the deflectors 10b. The gear box 11 encloses oppositely arranged bevel gears 12, 13 that alternately act as drivers and driven gears and are rotatably connected to the inner ends of the shafts 8, 9, respectively; said gear box also enclosing oppositely arranged bevel gears 14, 15 which are idlers and are disposed at right angles to and engage the gears 12 and 13, so that when one of the shafts 8 or 9 is positively driven in one direction by its respective pinion, it will, through the reversing gear mechanism 10, drive the other of said shafts in the opposite direction, for reasons hereinafter to be explained.

It has been assumed, for sake of illustration, that the hopper cars 4 are of the type having a car body resiliently supported by truck springs (not shown) relative to a railway car truck and having four normally inclined-when-closed dump doors that are each pivotally carried at their upper ends on a plurality of hinge pins supported by the under frame of the car body and running parallel to the track 2. Two of these dump doors 16, 17, (Fig. 4) are arranged crosswise of the car from each other forward of the reversing gear mechanism 10 and so carried on hinge pins 18, 19 (and others not shown) respectively, that they will swing in opposite directions (namely, inwardly toward each other) when moving to their respective fully open positions in which the doors hang vertically, and will swing away from each other when moving to their respective closed positions in which they are so inclined as to define therebetween an obtuse included angle. The other doors 16a, 17a are arranged crosswise of the car from each other rearward of the reversing gear mechanism 10 and similarly carried on hinge pins 18a, 19a (and others not shown) that are coaxially aligned with pins 18, 19, respectively, such that said other doors will swing toward and away from each other during opening and closing of such doors, respectively.

The unhinged lower ends of the doors 16, 17 are pivotally connected by pins 20a, 21a to respective one ends of levers 20, 21, which at their respective opposite ends are pivotally connected to toggle links 22, 23 which, in turn, are rotatably connected to actuating rods 24, 25 respectively, that run lengthwise of the car and are journaled at their opposite ends, respectively, in hood-like brackets 24a, 24b and 25a and a similar bracket (not shown) suitably secured to the adjacent side walls of the car, said actuating rods also controlling operation of the other doors 16a, 17a, respectively. Intermediate their respective ends, these actuating rods 24, 25 are rotatably and co-axially connected to worm wheels or reduction gears 26, 27 that are enclosed in gear boxes 28, 29 and are driven by worms 30, 31 formed on the shafts 8, 9, respectively; the axes of the rods 24, 25 being at right angles to and above the axes of the shafts 8, 9, respectively.

Referring now to Fig. 2, each door-opening control rack 1 has at its upper side a rack gear 1a with a profile as shown enlarged in Fig. 5 and at its lower side is pivotally connected by a plurality of links 32 to respective cross beams that are anchored to a part of a frame 34 of the dumping trestle. Also pivotally connected to the lower side of each rack 1 are a plurality of piston rods 35, each of which is connected to a respective piston (not shown) that is slidably mounted in the casing of a fluid pressure motor or cylinder 36 and is subject opposingly to pressure of fluid in a flexible hose 37 and to pressure of a helical bias spring (not shown). The casings of cylinders 36 are hingedly connected at their lower ends to respective cross beams that are anchored to the frame 34. When hose 37 is charged, each piston rod 35 will be moved outwardly by its piston and raise the rack 1 to an elevated position, in which it may be engaged by one of the opening pinions 6, the various links 32 and cylinders 36 swinging arcuately relative to their respective cross beams for permitting raising of the rack.

It is to be noted that the closing control rack 5 is of substantially the same construction and is controlled in the same manner as the opening control rack 1, the only difference being that it is disposed at the opposite side of the track 2 from the racks 1.

Pressure of fluid in the respective hoses 37 may be controlled in any suitable manner. However, it is preferable that a single magnet valve device 38 be provided for each rack 1 or 5 for controlling supply of fluid under pressure to and release of fluid under pressure from all cylinders 36 on such rack by controlling pressure in a single hose 37 having branches leading to each of said cylinders. Each of these magnet valve devices 38 may comprise a magnet 39 connected to a control wire 40 and grounded to a common ground wire 40a or to the trestle frame 34 and operative to actuate valve means (not shown) to supply fluid under pressure to hose 37 from a branch of a common fluid pressure supply pipe 41 extending along the trestle or connect said hose 37 to a vent pipe 42 according to whether said control wire 40 is energized or deenergized, respectively. It will be understood that each magnet valve device 38 will have a separate control wire 40 and that all of these control wires will lead to a central control switch (not shown) which may be actuated to selectively energize one or more of these control wires and thereby remotely control elevation of the racks 1 or 5 with which such control wires are associated.

*Operation—Figs. 1 to 5*

Assume initially that the train of hopper cars 4 is moving leftward, as viewed in Figs. 1 and 2, across the dumping trestle; that all control wires 40 are deenergized and hence all racks 1 and 5 are in their lowered positions; and that all of the doors 16, 17, 16a, 17a are closed. Under this condition, the door-opening pinions 6 on the respective cars will ride above and not engage any rack 1 which is maintained in its lowered position, and hence the cars will ride over such rack without opening the doors 16, 17, 16a, 17a and hence without discharging into the receptacle 3 controlled thereby.

As a particular hopper car 4 approaches a particular receptacle 3 into which the cargo is to be dumped, the operator energizes the control wire 40 of the magnet valve device 38 for the rack 1 associated with said receptacle, for thereby causing said rack to be moved to its elevated position in the manner above described. As soon as the door-opening pinion 6 on this particular car meshes with this rack 1, the leftward motion of said car will cause said pinion and hence its shaft 8 to rotate counterclockwise, as viewed in Fig. 2, and through the medium of the bevel gears 12, 14, 15, 13 of reversing gear mechanism 10, rotate the shaft 9 and its door-closing pinion 7 in the reverse direction. Hence, worm 30 on shaft 8 will rotate the reduction gear 26 and hence actuating rod 24 counterclockwise as viewed in Fig. 3, for thereby rocking the toggle link 22 (Fig. 4) up and over center (that is, above the projection of a line connecting the centers of rod 24 and pin 20a) and thus causing the dump door 16 to be operatively swung clockwise on hinge pin 18 toward its previously defined fully open position; and worm 31 on shaft 9 will rotate reduction gear 27 and hence actuating rod 25 clockwise, as viewed in Fig. 3, for thereby rocking toggle link 23 (Fig. 4) up and over center (that is, above the projection of a line connecting the centers of rod 25 and pin 21a) for operatively swinging dump door 17 toward its fully open position through the medium of link 23 and lever 21; and the other dump doors 16a, 17a will be operatively opened in similar manner by the actuating rods 24, 25 and by links and levers (not shown) similar to 22, 23 and 20, 21. Thus, as the train proceeds slowly leftward, the cargo from the particular car will be dumped into the appropriate receptacle 3.

To effect closure of the dump doors on a particular car, the operator energizes the control wire 40 of the magnet valve device 38 associated with the door-closing control rack 5 so that said rack will be at its elevated position by the time said car moves over said rack. As soon as the door-closing pinion 7 on this particular car meshes with rack 5, the leftward motion of said car will cause said pinion and hence its shaft 9 to rotate counterclockwise, looking in the direction of Fig. 2, and through the medium of the bevel gears 13, 14, 15, 12 of the reversing gear mechanism 10 rotate shaft 8 and its door-opening pinion 6 in the reverse direction. Hence, worm 31 on shaft 9 will rotate the reduction gear 27 and hence actuating rod 25 counterclockwise, as viewed in Fig. 3, for thereby rocking the toggle link 23 (Fig. 4) down and under center such that door 17 will be rocked on pin 19 to its closed position, in which it is shown in Fig. 4, through the medium of lever 21; and worm 30 on shaft 8 will rotate the reduction gear 26 and hence actuating rod 24 clockwise, as viewed in Fig. 3, for thereby rocking toggle link 22 down and under center for operatively swinging the door 16 to its closed position, in which it is shown in Fig. 4, through the medium of link 22 and lever 20; and the other dump doors (16a, 17a) will be operatively closed in similar manner by the actuating rods 25, 24 and by links and levers (not shown) similar to 23, 22 and 21, 20. Thus, by the time the particular car has moved downtrack past the rack 5, all dump doors on said car will be closed, so that the train will thereupon be conditioned for reloading.

The racks 1 and 5 are preferably of such length as to assure that the pinions 6 and 7, respectively, will be rotated a sufficient number of turns to effect movement of the dump doors to their fully open and closed positions, the worms and reduction gears being employed to provide the requisite torque on rods 24, 25 to produce such movement. The effective length of the door-closing rack 5 should always be at least equal to the effective length of the door-opening racks 1 to assure that all doors will be completely closed by the time a car passes the door-closing rack 5.

Assume now that the door-opening racks 1 are of shorter effective length than that of the door-closing rack 5, or that the operator did not elevate a door-opening rack 1 until the pinion 6 had moved past the right-hand end of said rack 1 and that the dump doors therefore did not fully open, or that for any other reason the dump doors are fully closed before the pinion 7 has left the door-closing rack 5. Under any of these conditions, it is obvious that the pinion 7 cannot rotate after the dump doors are closed. It is therefore important that the fluid supplied via hose 37 to the cylinders 36 be at a sufficiently low pressure to assure that the teeth of pinion 7 can slide over the teeth of rack 5 by depressing said rack slightly against the resilient upward force provided by fluid pressure in hose 37, so that if said pinions cannot rotate, said pinions may be dragged over the teeth of the rack and thereby assure against shearing of the teeth of the pinions 7 or rack 5, or shearing of the shafts 9.

Assume now that either through inadvertence or in order to permit completion of discharge of a car into another adjacent receptacle 3 after one receptacle 3 is filled, the operator permits the opening pinion 6 on a car which has already been emptied to engage a door-opening rack 1 downtrack of the receptacle into which the cargo was primarily dumped, or that for any other reason pinion 6 is prevented from rotating while in engagement with a rack 1. It is to be noted that the pressure of fluid supplied to the cylinders 36 of the door-opening racks 1 is similarly limited so that if the door-opening pinions 6 are prevented from rotating, they, likewise, may be dragged over the teeth of the racks, without shearing the teeth of the pinions or racks or shearing the shafts 8.

In the event that some of the dump doors are excessively hard to move out of closed position or out of fully open position, the pinions 6 or 7 may slide over the first few teeth of the racks 1 or rack 5. This sliding of the pinions over the rack will impart a series of hammer blows to the pinions which should assist in initiating rotation of the pinions and hence movement of the dump doors. Similarly, it might be found advantageous to add a few teeth to the length of the door-closing rack for the purpose of providing a few hammer blows to the door-closing pinions 7 to insure that the toggle links 23 will be positively driven down under center for securely locking the dump doors in their closed positions.

Each of the door-opening racks 1 and the door-closing rack 5 preferably has adjacent its approach or uptrack end a slightly downturned toothed portion to permit the pinions 6 or 7, respectively, to ride smoothly onto the corresponding rack.

If the car is loaded with cargo of the type, such as ore in chunks, which requires full opening of the doors to completely discharge the cargo, it is desirable that each door-opening rack 1, adjacent its downturned toothed portion and extending a relatively short distance from a point A to a point B (Fig. 2), be provided with a level toothed portion, and that from the point B to a point C at its departure end each door-opening rack 1 be provided with a slightly upwardly inclined toothed portion. This level toothed portion is preferably of sufficient length to effect rotation of the actuating rods 24, 25 enough to move the toggle links 22, 23 up and over center and thereby initiate opening of the dump doors. The slightly upwardly inclined toothed portion is provided to insure continuous contact of the pinions 6 with the rack 1 as the car body rises during discharge of cargo and consequent lightening of the load.

If, however, the car is loaded with cargo which is of substantially uniform small size and readily discharged even through partially open dump doors, it may be preferable to provide a level toothed portion extending from the point A to the point C (Fig. 2) and eliminate the slight upwardly inclined toothed portion. With a rack 1 of the configuration last described, the door-opening pinion 6 will rise out of engagement with the rack 1 when the dump doors have been opened sufficiently to assure effective discharge of the cargo, and the pinions 6 on empty cars will thus ride over the racks 1 even though such racks may then be raised to engage the pinions 6 on loaded cars. With a cargo of the type last assumed, it may also be desirable to shorten the rack 1 to some point between the points B and C at which sufficient opening of the dump doors will be assured to permit complete discharge of cargo.

It should here be noted that the reversing gear mechanism 10 is provided not only to enable the dump doors to be successively opened and closed as the train moves in a certain direction (namely leftward as viewed in Figs. 1 and 2) across and past the dumping trestle, but also to permit opening and closing of the dump doors by the pinions 6, 7 and racks 1, 5 even if any one or all of the cars should be reversed end-for-end before they are again hauled in said certain direction across the dumping trestle. If any car is thus reversed end-for-end, the pinion 7 will, of course, become the door-opening pinion, and the pinion 6 will become the door-closing pinion, but each of the shafts 9, 8 will be caused to rotate in the respective direction in which it rotated before such reversal when effecting opening and closing of the dump doors.

It will also be understood that while the invention has been shown applied to conventional hopper cars having transversely swingable dump doors that move oppositely (that is, toward and away from each other), the invention may readily be applied to conventional hopper cars of the type having longitudinally swingable dump doors that move oppositely (that is, toward and away from each other). When applied to the latter type of cars, the pinions 6, 7, shafts 8, 9 and reversing gear mechanism 10 would be employed but, instead of the worms 30, 31 and reduction gears 26, 27, sutable gearing could be used to control opposing rotation of actuating rods that, in turn, through levers control the opening and closing of the longitudinally swingable dump doors. For example, straight spur gears (instead of worms 26, 27) could be rotated by the shafts 8, 9 and meshed with spur-type reduction gears (instead of the worm-wheel type reduction gears) for controlling opposing rotation of actuating rods which would run crosswise rather than lengthwise of the car.

It will also be apparent that the invention may be used to control opening and closing of opposingly operable discharge valves on tank cars by a proper gear take-off from the shafts 8, 9 and by appropriate lever means. For example, the worms 30, 31, reduction gears 26, 27 and actuating rods 24, 25 could be used, with the rods 24, 25 or some levers operably connected thereto, controlling opening and closing of such discharge valves.

Nuts 43, 44 (Fig. 3) are preferably keyed to extensions of the outer ends of the shafts 8, 9 outwardly of the pinions 6, 7 respectively, and suitably slotted to receive wrenches to permit the shafts 8, 9 to be rotated manually or by a pneumatic wrench so that the dump doors may be opened or closed, if desired, when the cars are outside of the dumping area.

Description and operation—Fig. 6

The control apparatus according to this embodiment of the invention differs from that described in connection with Figs. 1 to 5 only in that rubber-tired wheels 45 (only one of which is shown) are employed in lieu of pinions 6, 7, and channels 46 (only one of which is shown) which may be in the nature of U or H-shaped beams having their upper recessed sides filled with a suitable abrasive such as concrete, are provided in lieu of the toothed racks 1 and 5.

The door-opening channel 46 may have a level portion and an upwardly inclined portion or have only the level portion, according to the type of cargo carried by the cars, as will be understood from previous description in connection with door-opening rack 1. However, if the dump doors are fully closed or fully opened while a rubber-tired wheel 45 is in engagement with its respective channel 46, said wheel will tend to scuff or skid over the channel rather than depress it. This embodiment would be suitable for those applications where the torque force required to effect opening and closing of the dump doors is relatively low, whereas the embodiment of Figs. 1 to 5 is preferable where such torque force is relatively high.

Having now described the invention, what I claim as new and desire to secure by Letters Patent, is:

1. Apparatus for actuating, from the wayside while a railway car is moving longitudinally in a certain direction, a pair of actuating rods which are carried on the car and are oppositely rotated to perform one control function and each oppositely reversely rotated to perform on the car another control function which is the reverse of said one control function, said apparatus comprising a first rotatable element carried on the car a predetermined distance at one side of the longitudinal center line thereof for controlling the one control function, a second rotatable element carried on the car said predetermined distance at the opposite side of this longitudinal center line for controlling the other control function, a pair of means each operatively connecting one of said rotatable elements with a corresponding one of the actuating rods for controlling rotation of the latter, reversing gear means on the car interposed between said rotatable elements and responsive to rotation of one of said rotatable elements in one direction to effect rotation of the other rotatable element in the opposite direction, a first control means disposed on the wayside and engageable by said first rotatable element or said second rotatable element according to whether one end or the opposite end of the vehicle is serving as the lead end, and a second control means disposed on the wayside and spaced in said certain direction from said first control means and engageable by said second rotatable element or said first rotatable element according to whether said one end or said opposite end of the vehicle is serving as the lead end, either of said rotatable elements when it is engaged with said first control means being rotated one way by movement of the car in said certain direction for operatively causing operation of both actuating rods to perform the one control function, and the remaining one of said rotatable elements when it is engaged with said second control means being rotated said one way by movement of the car in said certain direction for operatively causing both actuating rods to perform the other control function.

2. In an apparatus for controlling, from the wayside, opening and closing of two oppositely operable members on a vehicle during movement of the vehicle longitudinally in a certain direction along a defined path so as to thereby control discharge of cargo from the vehicle into a receptacle, the combination of a pair of actuating rods each carried by the vehicle and each rotatable in different directions to operatively effect opening of a respective one of said members and each rotatable in a respective reverse direction to operatively effect closure of its respective member, an opening rotatable element carried by the vehicle a predetermined distance at one side of the longitudinal center line thereof, a closing rotatable element carried by the vehicle said predetermined distance at the opposite side of this longitudinal center line, a pair of shafts each of which is rotatable by one of said rotatable elements, a pair of means each operatively connecting one of said shafts with a corresponding one of said actuating rods for controlling direction of rotation of such actuating rod according to the direction of rotation of such shaft, reversing gear means interposed between said shafts and responsive to rotation of one of said shafts in one direction by its corresponding rotatable element to effect rotation of the other shaft in the reverse direction, an opening control means so disposed on the wayside in proximity of the receptacle as to be engageable by said opening rotatable element, and a closing control means spaced in said certain direction from said opening control means and so disposed on the wayside as to be engageable by said closing rotatable element, said opening rotatable element when it is engaged with said opening control means being rotated one way by movement of the vehicle in said certain direction for operatively causing opening of both the members, and said closing rotatable element when it is engaged with said closing control means being rotated said one way by movement of the vehicle in said certain direction for operatively causing closure of both of the members, and whereby with said opening rotatable element and closing rotatable element disposed at said predetermined distance at opposite sides of the longitudinal center line of the vehicle, said vehicle may be reversed end-for-end and run in said certain direction in which case said closing rotatable element will act in the same manner as and become the opening rotatable element and vice versa.

3. The combination according to claim 2, wherein said rotatable elements are pinions disposed at the opposite sides of the vehicle, and said shafts extend transversely of the vehicle, and wherein said opening control means and closing control means are racks disposed at opposite sides of the center and running parallel to the defined path of movement of the vehicle, so as to be engaged by said opening and closing rotatable elements in the stated manner.

4. The combination according to claim 2, wherein said rotatable elements are rubber-tired wheels disposed at opposite sides of the vehicle, and said shafts extend transversely of the vehicle, and wherein said opening control means and closing control means are channels providing abrasive surfaces disposed at opposite sides of the center of and running parallel to the defined path of movement of the vehicle, so as to be engaged by said opening and closing rotatable elements in the stated manner.

5. The combination according to claim 2, wherein each of the pair of means operatively connecting one of said shafts with a corresponding one of said actuating rods comprises a worm rotatably mounted on such shaft and a worm reduction gear driven by said worm and coaxially connected to such corresponding actuating rod for controlling rotation of the latter, the axis of the respective shaft being at right angles to the axis of the corresponding actuating rod.

6. In an apparatus for controlling, from the wayside, opening and closing of two oppositely swingable dump doors on a hopper car during movement of the car in a certain direction along a railroad track for controlling discharge of cargo from the vehicle into a cargo-receiving receptacle, the combination of a pair of actuating rods each carried by the car and each rotatable in a different direction for operatively effecting opening of one of the dump doors and each rotatable in a respective reverse direction for operatively effecting closure of its respective dump door, an opening rotatable element carried by the car, a closing rotatable element carried by the car and spaced transversely of said opening rotatable element, a pair of shafts extending transversely of the car and each rotatable by a corresponding one of said rotatable elements, a pair of means each operatively connecting one of said shafts with a corresponding one of said actuating rods for controlling the direction of rotation of such actuating rod according to the direction of rotation of such shaft, reversing gear means interposed between said shafts and responsive to rotation of one of said shafts in one direction by its corresponding rotatable element to effect rotation of the other shaft in the reverse direction, an opening control means so disposed on the wayside in proximity of and controlling discharge into the receptacle as to be engageable only by said opening rotatable element, and a closing control means spaced in said certain direction from said opening control means and so disposed on the wayside as to be engageable only by said closing rotatable element, motion of the car in said certain direction while said opening rotatable element is in engagement with said opening control means developing a torque force on said opening rotatable element which effects rotation thereof one way for operatively causing opening of both of the dump doors, and motion of the car in said certain direction while said closing rotatable element is in engagement with said closing control means developing a torque force on said closing rotatable element which effects rotation thereof said one way for operatively causing closure of both of the dump doors.

7. An apparatus for controlling, from the wayside while a hopper car is moving in a certain direction along a railroad track, opening and closing of two oppositely swingable dump doors for thereby controlling discharge of cargo from the vehicle into one of a plurality of adjacent receptacles, said apparatus comprising, in combination, a pair of actuating rods each carried by the car and each rotatable in a different direction for operatively effecting opening of one of the dump doors and each rotatable in a respective reverse direction for operatively effecting closure of its respective dump door, an opening rotatable element carried by the car, a closing rotatable element carried by the car and spaced transversely of the car from said opening rotatable element, a pair of shafts extending transversely of the car and each rotatable by a corresponding one of said rotatable elements, a pair of means each operatively connecting one of said shafts with a corresponding one of said actuating rods for controlling the direction of rotation of such actuating rod according to the direction of rotation of such shaft, reversing gear means interposed between said shafts and responsive to rotation of one of said shafts in one direction by its corresponding rotatable element to effect rotation of the other shaft in the reverse direction, a plurality of opening control means so disposed in spaced relation along the wayside as to be engageable only by said opening rotatable element and each controlling discharge of cargo from the car into a respective one of the receptacles, and a single closing control means spaced in said certain direction from said opening control means and so disposed on the wayside as to be engageable only by said closing rotatable element, said opening rotatable element when it is engaged with any one of said opening control means being rotated one way by movement of the car in said certain direction for operatively causing opening of both of the dump doors for discharging cargo into the receptacle controlled by said one opening control means, and said closing rotatable element when it is engaged with said closing control means being rotated said one way by movement of the car in said certain direction for operatively causing closure of both of the dump doors after the cargo has been discharged.

8. The combination according to claim 7, including means for each opening control means normally biased to one position in which its respective opening control means cannot be engaged by said opening rotatable element and chargeable with fluid under pressure for actuating its respective opening control means to another position in which it may be engaged by said opening rotatable element, and a separate operator-controlled magnet valve means for each opening control means, each of said magnet valve means being selectively deenergizable and energizable for selectively controlling venting and supply of fluid under pressure to a corresponding normally biased means, whereby the operator may remotely select any receptacle into which the cargo of the car is to be discharged.

9. The combination according to claim 7, wherein said opening and closing rotatable elements are pinions, and said opening and closing control means are racks running parallel to the track and engageable by said pinions, each of said opening control racks comprising a downturned toothed portion extending a short distance in said certain direction from its uptrack end and a remaining substantially level toothed portion.

10. The combination according to claim 7, wherein said opening and closing rotatable elements are pinions, and said opening and closing control means are racks running parallel to the track and engageable by said pinions, each of said opening control racks comprising a slightly upwardly inclined toothed portion extending in a direction opposite said certain direction from its downtrack end for maintaining such opening control rack in engagement with the corresponding pinion as the car body rises due to lightening of the load during discharge of cargo.

11. In an apparatus for controlling, from the wayside, opening of a member on a vehicle to effect discharge of cargo from the vehicle into a receptacle while the vehicle is moving in a defined path, the combination of a pinion carried by the vehicle, means responsive to rotation of said pinion one way to operatively cause opening of the member, a control rack disposed on the wayside along the defined path and operative when engaged by said pinion during movement of the vehicle along its defined path to effect rotation of said pinion said one way, and means for resiliently biasing said control rack into engagement with said pinion for causing said control rack normally to be continuously maintained in contact with the pinion despite any increase in the height of said pinion due to discharge of the cargo, said biasing means also serving to permit said control rack to be depressed if said pinion, upon attaining the limit of its rotative movement said one way, is still in engagement with said control rack so as thereby to permit the teeth of said pinion to be dragged over the teeth of said control rack without shearing any of such teeth.

12. For use with a vehicle, such as a railway car, that may be hauled from either end, apparatus for actuating from the wayside while such vehicle is moving in a certain direction with either end as the head end, a pair of actuating rods which are carried on the vehicle and are oppositely rotated to perform one control function and each oppositely reversely rotated to perform on the vehicle another control function which is the reverse of said one control function, said apparatus comprising a pair of rotatable elements carried by the vehicle and disposed at opposite sides of and at equal distances from the longitudinal center line of the vehicle, a pair of means each operatively connecting a respective one of said rotatable elements with a corresponding one of the actuating rods for controlling rotation of the latter, reversing gear means on the vehicle interposed between said rotatable elements and responsive to rotation of one of said rotatable elements in one direction to effect rotation of the other rotatable element in the opposite direction, a pair of control means so disposed on the wayside as to be engageable by a respective one of said rotatable elements during such movement of the vehicle, one of said control means when engaged with either of said rotatable elements while the vehicle is moving in said certain direction serving to rotate such rotatable element one way for operatively causing the actuating rods to perform said one control function, the other of said control means being spaced in said certain direction from said one control means and operative when engaged with the remaining one of said rotatable elements while the vehicle is moving in said certain direction to rotate such rotatable element said one way for operatively causing the actuating rods to perform said other control function serially after the performance of said one control function, whereby with the vehicle moving in said certain direction either of said rotatable elements may engage said one control means and the remaining rotatable element will engage said other control means according to whether one end or the opposite end of the vehicle is serving as the head end.

13. The combination according to claim 12, including means for resiliently biasing each control means in a rotatable-element-engaging direction, each of said resilient biasing means serving to effect and maintain engagement of its associated control means with a respective one of said rotatable elements and also permit such associated control means to be depressed in the opposite direction so as to enable sliding of such rotatable element relative to such control means if rotation of such rotatable element should be prevented in consequence of completion of the particular control function.

References Cited in the file of this patent

UNITED STATES PATENTS

| | | |
|---|---|---|
| 280,621 | Hetfield | July 3, 1883 |
| 601,203 | Truax | Mar. 22, 1898 |
| 716,423 | Hunt | Dec. 23, 1902 |
| 1,232,119 | Summers | July 3, 1917 |
| 1,316,129 | Williamson | Sept. 16, 1919 |
| 1,434,682 | Cormack | Nov. 7, 1922 |